United States Patent [19]

Kotani et al.

[11] Patent Number: 4,827,355
[45] Date of Patent: May 2, 1989

[54] READER/RECORDER ASSEMBLY IN A FACSIMILE SYSTEM

[75] Inventors: Matahira Kotani; Masafumi Matsumoto; Ryoichi Kawai, all of Nara; Kenichi Shiraishi, Yamatokoriyama, all of Japan

[73] Assignee: Sharp Kabushiki Kaisha, Osaka, Japan

[21] Appl. No.: 918,562

[22] Filed: Oct. 14, 1986

[51] Int. Cl.⁴ .............................................. H04N 1/10
[52] U.S. Cl. ..................................... 358/296; 358/302
[58] Field of Search ............... 358/296, 285, 286, 302; 355/8

[56] References Cited

U.S. PATENT DOCUMENTS

| | | | |
|---|---|---|---|
| 4,196,455 | 4/1980 | Brooke | 358/285 X |
| 4,700,238 | 10/1987 | Sugiyama | 358/296 |

FOREIGN PATENT DOCUMENTS

| | | |
|---|---|---|
| 0048118 | 9/1981 | European Pat. Off. . |
| 0061921 | 3/1982 | European Pat. Off. . |
| 2518370 | 11/1976 | Fed. Rep. of Germany . |
| 2832292 | 2/1980 | Fed. Rep. of Germany . |
| 3238455 | 5/1983 | Fed. Rep. of Germany . |
| 58-00044 | 2/1983 | Japan . |
| 60-141072 | 7/1985 | Japan .......... 358/285 |
| 1534529 | 12/1975 | United Kingdom . |
| 1585975 | 11/1977 | United Kingdom . |
| 2004717 | 9/1978 | United Kingdom . |
| 2106349 | 5/1979 | United Kingdom . |
| 2103447 | 5/1979 | United Kingdom . |
| 2093312 | 1/1982 | United Kingdom . |
| 2098131 | 4/1982 | United Kingdom . |
| 2160736 | 4/1984 | United Kingdom . |
| 8300860 | 6/1983 | World Int. Prop. O. . |

Primary Examiner—Clifford C. Shaw
Attorney, Agent, or Firm—Birch, Stewart, Kolasch & Birch

[57] ABSTRACT

An image reader/recorder assembly unit for use in a facsimile system is provided with an image reader containing a number of sensor elements aligned in an image scanning direction and an image recorder containing a number of recording elements. The image reader and the image recorder are of a specific length shorter than the full scanning width. Image data is read and recorded as the image reader and the image recorder move in the image scanning direction, both of these units being mounted on independent carriages. In addition, the edges of adjacent image data are recorded twice at a lower density to achieve a predetermined density through two recording operations despite superimposition. This prevents degradation of the recorded image data quality.

8 Claims, 2 Drawing Sheets

READER/RECORDER ASSEMBLY IN A FACSIMILE SYSTEM

BACKGROUND OF THE INVENTION

1. Field of the Invention

The present invention relates to an improved reader/recorder assembly unit for reading and recording an image in a facsimile system.

2. Description of the Prior Art

Conventional facsimile systems are provided with either a reader/recorder assembly unit 21, having a length corresponding to the width of an image to be scanned as shown in FIG. 1, or a reader/recorder assembly unit 22, located perpendicular to the image and driven in the scanning direction by a carriage 23, as shown in FIG. 2. In the former configuration, a specific length corresponding to the scanning length is needed for the reader/recorder assembly unit 21, and because the charge-coupled device (CCD) used in the reader device and the thermal head used in the recorder device are both expensive, the reader/recorder assembly unit itself becomes quite expensive. A problem with the latter configuration is that the reader/recorder assembly unit 22 is mounted on a single carriage 23. This generates a large inertial force during driving and an increased load on the driving motor.

OBJECTS OF THE INVENTION

The primary object of the present invention is to provide a novel image reader/recorder assembly unit for a facsimile system. Another object of the present invention is to provide a compact reader/recorder assembly unit that ensures stable operation.

Other objects and the further scope of applicability of the invention will become apparent from the detailed description given hereinafter. It should be understood, however, that the detailed description and specific examples, while indicating preferred embodiments of the invention, are given by way of illustration only, since various possible changes and modifications within the spirit and scope of the invention will become apparent to those skilled in the art from the following detailed description.

SUMMARY OF THE INVENTION

The present invention provides a novel reader/recorder assembly unit which uses picture elements aligned in the scanning direction of the image data to be read or recorded. It is provided with an image reader and an image recorder, each having a specific length shorter than the scanning width, while the novel assembly unit reads and records the image data by moving both the reader and the recorder in the scanning direction. The reader and the recorder are each mounted on an independently installed carriage. The reader/recorder assembly unit of the present invention provides a reader and recorder each with a specific length shorter than the scanning width, thus effectively reducing the total cost of the facsimile system. Furthermore, the provision of two independent carriages for the reader and recorder reduces inertia during driving, thereby minimizing the load on the driving motor. In addition, the reader/recorder assembly unit embodied by the present invention allows the edges of adjacent image data to be superimposed during recording while these edges have a lower tone of recording, so that a predetermined density of the overlapping area can be achieved through two recording operations. These features effectively prevent degradation of the quality of the recorded image.

BRIEF DESCRIPTION OF THE DRAWINGS

The present invention will be better understood from the detailed description given hereinbelow and the accompanying drawings which are given by way of illustration only, and thus are not limitative of the present invention in which.

DESCRIPTION OF THE PREFERRED EMBODIMENTS

Figure 3:
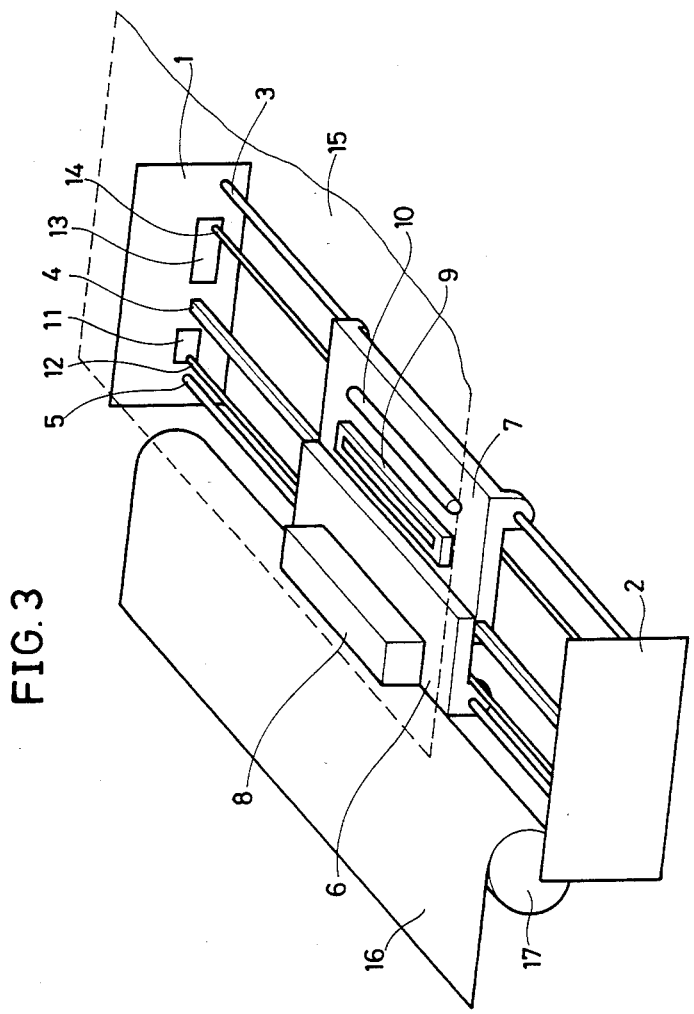
FIG. 3 is a perspective view of a reader/recorder assembly unit employed in a facsimile system of one of the preferred embodiments of the present invention.

FIG. 3 is a perspective view of a reader/recorder assembly unit employed in a facsimile system of one of the preferred embodiments of the present invention.

Figure 1:
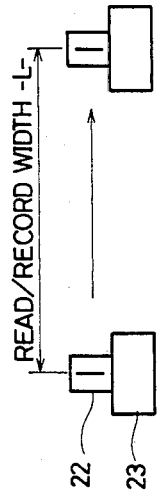
FIG. 1 is a schematic plan view of an example of a reader/recorder assembly unit employed in a prior art facsimile system.
Figure 2:
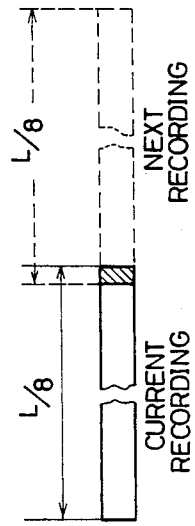
FIG. 2 is a schematic front view of another example of a reader/recorder assembly unit employed in a prior art facsimile system.
Figure 4:
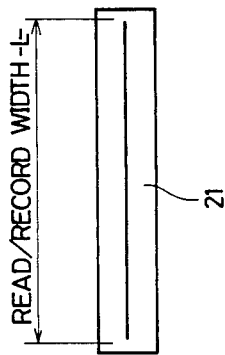
FIG. 4 is a schematic front view of an essential part of the reader/recorder assembly unit shown in FIG. 3.
Figure 5:
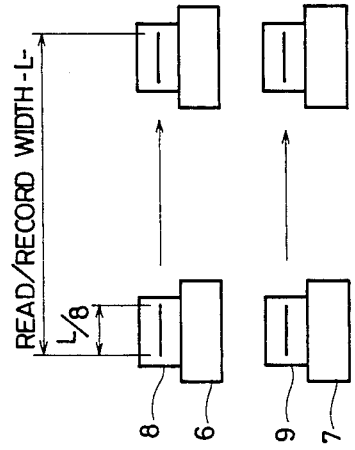
FIG. 5 is a schematic plan view denoting an image recording operation executed by the reader/recorder assembly unit shown in FIG. 3.

Guide rails 3, 4, and 5 are installed parallel to each other between a pair of side boards 1 and 2. A carriage 6 slides freely along the guide rails 4 and 5, and likewise, a carriage 7 slides freely along the guide rails 3 and 4. A thermal head 8 is mounted on the carriage 6, and a charge-coupled device (CCD) 9 and a light source 10 are mounted on the carriage 7. The carriage 6 is driven by a drive motor 11 via a belt or wire 12, and the carriage 7 is driven by a drive motor 13 via a belt or wire 14. The CCD 9 faces an original document 15 and is mounted on the carriage 7 so that the picture elements can be aligned in the scanning direction. The length of the CCD 9 is shorter than the scanning width of the original 15, for example, one-eighth the scanning width L. The thermal head 8 faces thermal recording paper 16 and is mounted on the carriage 6 so that the picture elements can be aligned in the scanning direction. The length of the thermal head 8 is also shorter than the scanning width of the thermal recording paper 16, for example, one-eighth the scanning width L. As shown in FIG. 4, in an image reader/recorder assembly unit for a facsimile system reflecting the present invention, the carriages 6 and 7 can move independently, allowing the CCD 9 mounted on the carriage 7 and the thermal head 8 mounted on the carriage 6 to move in the scanning direction to read and record image data. To read image data to be transmitted, the light source 10 illuminates, and its light reflects off the original 15, allowing the CCD 9 to receive the illuminated image from the original 15. As for recording, the thermal head 8 records the received image data on the thermal recording paper 16 delivered around a platen roller 17. The carriages 6 and 7 remain at a stand still while either a reading or a recording operation within the distance corresponding to the width of the CCD 9 or the thermal head 8 is under way. As soon as the reading or recording operation is completed, the carriages 6 and 7 resume their movement in the scanning direction to repeat the procedures. Once the reading or recording of one row of the image data is completed, either the original 15 or the thermal recording paper 16 moves in the direction perpendicular to the scanning direction, and the carriages 6 and 7 return to their designated positions to read or record the next row of the image data. In the reader/recorder assembly unit related to the present invention, the carriages 6 and 7 may also move jointly to read and record the image data. During recording of image data, the carriage 6 repeatedly moves by the distance corresponding to the width of the thermal head 8. To prevent blank portions from appearing at the edges of recorded adjacent image data, the reader/recorder assembly unit related to the present invention allows overlapped recording of identical images at those edges. This prevents incorrect connections of the edges due to inaccurate stopping of the movement of the carriage 6. Furthermore, the unit allows the image data indicated by the shaded portion of FIG. 5 to be recorded at a lower density twice so that a predetermined density of the printed picture can be achieved despite superimposition. The invention being thus described, it will be obvious that the same may be varied in numerous ways. Such variations are not to be regarded as a departure from the spirit and scope of the invention, and all such modifications are intended to be included within the scope of the following claims.

What is claimed is:

1. An image reader/recorder assembly for a facsimile system having a sole image scanning direction, comprising:

a first carriage movable along said image scanning direction;

image reader means, mounted on said first carriage, for reading an image to be transmitted to a remote facsimile system, said reader means including a plurality of image sensor elements linearly arranged in substantial alignment parallel to and along said scanning direction;

reader drive means for shifting the position of said first carriage along said scanning direction;

a second carriage movable along said image scanning direction;

image recorder means mounted on said second carriage, for recording an image received from a remote facsimile system, said recorder means including a plurality of recording elements also linearly arranged in substantial alignment parallel to and along said scanning direction;

recorder drive means for shifting the position of said second carriage along said scanning direction; and means for advancing a recording medium on which said received image is recorded, in a direction perpendicular to said scanning direction.

2. The image reader/recorder assembly defined in claim 1, in which said image reader means includes a plurality of charge-coupled device (CCD) elements, and in which said image recorder means includes a plurality of thermal recording elements.

3. The image reader/recorder assembly defined in claim 1, in which said image recorder means includes means for superimposing identical image data at an edge thereof as said recorder means is shifted along said scanning direction, to compensate for any inaccurate positioning of said second carriage means by said recorder drive means.

4. The image reader/recorder assembly defined in claim 3 wherein said plurality of recording elements are arranged in a linear array having a length less than one quarter of the scan width of said reader means.

5. The image reader/recorder assembly defined in claim 1 wherein said plurality of image sensor elements are arranged in a linear array having a length less than one-quarter of the scan width of said reader means.

6. The image reader/recorder assembly defined in claim 1 wherein said respective pluralities of reading and recording elements are arranged in equal length linear arrays.

7. The image reader/recorder assembly defined in claim 6 where said arrays have a length substantially equal to one-eighth of the scan width of the respective reader means and recorder means.

8. The image reader/recorder assembly defined in claim 7 and in which said image recorder means includes means for superimposing identical image data at an edge thereof as said recorder means is shifted along said scanning direction, to compensate for any inaccurate positioning of said second carriage means by said recorder drive mean.

* * * * *